United States Patent [19]

Bauer et al.

[11] Patent Number: 4,535,456

[45] Date of Patent: Aug. 13, 1985

[54] METHOD OF DETECTING EXECUTION ERRORS IN PROGRAM-CONTROLLED APPARATUS

[75] Inventors: Kurt Bauer, Ostfildern-Nellingen; Karl-Heinz Fischer, Markgröningen; Heinz Huber, Ludwigsburg, all of Fed. Rep. of Germany

[73] Assignee: Robert Bosch GmbH, Stuttgart, Fed. Rep. of Germany

[21] Appl. No.: 466,875

[22] Filed: Feb. 16, 1983

[30] Foreign Application Priority Data

Feb. 26, 1982 [DE] Fed. Rep. of Germany ....... 3206891

[51] Int. Cl.³ ............................................. G06F 11/00
[52] U.S. Cl. .................................... 371/16; 364/200; 364/186; 364/141
[58] Field of Search ................... 371/16, 62; 364/200, 364/900, 186, 141

[56] References Cited

U.S. PATENT DOCUMENTS

| | | | |
|---|---|---|---|
| 4,176,781 | 12/1979 | Huesing et al. | 371/16 |
| 4,251,885 | 2/1981 | Dodt et al. | 371/16 |
| 4,282,584 | 8/1981 | Brown et al. | 364/186 |
| 4,314,329 | 2/1982 | Crewe et al. | 364/900 |
| 4,456,951 | 6/1984 | Henneberger et al. | 364/186 |

OTHER PUBLICATIONS

Elektronik-Issue 30, No. 25/26, Dec. 18, 1981, Lawrenz et al., "Fehlerdiagnose für Industriesteurnegen", pp. 89-92.

Primary Examiner—Jerry Smith
Assistant Examiner—Michael R. Fleming
Attorney, Agent, or Firm—Frishauf, Holtz, Goodman & Woodward

[57] ABSTRACT

To permit, by a program, supervision of a programmable controller, which controls, for example, operation of a machine tool, or other device in which sequential events occur, a computer controlled diagnostic unit (2) is connected to the programmable controller (1). The stepping or sequencing structure of the program in the programmable controller (1) is stored in the diagnostic unit (2), for example in a fixed memory (ROM 4). Supervision of the control of the machine tool, engine, or other operating unit, for example due to malfunction of transducers, connecting lines, and the like, is supervised by testing if the conditions for going from one step in a program to the next step are always satisfied; if an error is recognized, the respective steps of the control program are interrogated, and the conditions for stepping from one step to the next are tested. That one of the steps which does not meet the further sequencing conditions—or the next preceding one which does meet the conditions—then provide an indication of the source of the error, malfunction or trouble.

8 Claims, 6 Drawing Figures

| MEMORY ADDRESS | OPERATOR | OPERAND | |
|---|---|---|---|
| 0009 | RA | 3.1 | }–22 |
| 0010 | UE | 1.1 | }–23 |
| 0011 | UE | 1.2 | |
| 0012 | UA | 3.1 | }–24 |
| 0013 | SA | 3.2 | }–25 |
| 0014 | UA | 3.3 | }–26 |
| 0015 | RA | 3.2 | | a)   b)

METHOD OF DETECTING EXECUTION ERRORS IN PROGRAM-CONTROLLED APPARATUS

The present invention relates to a method to detect errors or faults in the execution of steps commanded by a control apparatus, such as a programmable controller (PC), and more particularly to a method to detect errors in execution of specific operating steps to be carried out by an industrial apparatus or a machine, such as machine tool, and other apparatus and machinery carrying out repetitively occurring sequential operating or operation steps.

BACKGROUND

Various arrangements and methods of fault diagnosis are known. The publication "Elektronik", issue 25/26 of 1981, in an article by Lawrenz and Timmermann, pp. 89-92, describes a method for error diagnosis of industrial control sequencing which is specifically adapted to decrease down time of machine tools upon malfunction of an electronic control system therefor. The error diagnosis, as described in this article, utilizes an error diagnostic program which tests or checks the input signals and output signals controlling the particular industrial process or sequencing with respect to error or malfunction. The example which is given in this article describes control of sorting of goods carried on a conveyor belt in which defective goods, for example some which do not have a label attached thereto or the like, are ejected from the normal production line for rework or the like. As described, malfunction in a system can arise due to defects not only in the control system as such, but also in transducers, cabling interconnecting the transducer, or transducers, and the actual control apparatus, in relays and wiring connected thereto, and the like. To detect errors, an error diagnostic program is provided which actually checks the input and output signals. A diagnostic calculator or computer arrangement is provided which is connected to the control elements, and input/output units over data buses. The diagnostic computer apparatus includes an error checking table, which is applied thereto by the user, in accordance with the desired operating program of the machine, in the selected example, the determination and ejection of incorrectly labeled or manufactured goods. The error checking table must contain the respective signal combinations, to be derived from and issued by the control apparatus, and which lists all the possible combinations of permitted and erroneous combinations of input and output signals, respectively.

Diagnosis of malfunction in accordance with the described method is complex. It requires, first, generation of the program which controls the industrial process, that is, the stored program relating input and output signals of the particular apparatus or machine which is to be controlled; this program, thus, must contain a table or memory addresses in which all commanded and permitted signal combinations are contained. For error diagnosis, then, it is additionally necessary to provide a further table which contains all possible signal combinations which are not permitted, or are indicative of malfunction. It is practically impossible to determine all possible combinations of error signals.

If the basic program is to be changed, even only slightly, it will then become necessary to correct the error checking table. Only those errors will be recognized which are contained within the error checking table.

The method, as described, thus is time-consuming and not unambiguously suitable for determining all possible errors since those which cannot be foreseen, of course, cannot be included within the diagnostic error table.

THE INVENTION

It is an object to provide an improved method of detecting faults in carrying out a sequential program which is simple and results in a diagnostic arrangement which is independent of specific programming steps being carried out.

Briefly, the sequencing structure or arrangement of the program to be carried out for sequencing of the industrial process is stored in the diagnostic apparatus, for example in memory therein. The diagnostic apparatus, upon checking for malfunction or errors, interrogates each step; if the step is erroneous, for example if its execution takes a time which is in excess of a predetermined time, then the prerequisite conditions for further execution are also checked.

The system has the advantage that only the step structure of the program which controls the machine tool, or other device, need be read into the diagnostic apparatus. The diagnostic apparatus then, itself, can independently interrogate whichever step which is being carried out, and check the conditions for further stepping. Since the stepping structure is fixed when the program for the machine tool, or the like, is generated, it is only necessary to store corresponding addresses in the diagnostic apparatus. Having the addresses stored in the diagnostic apparatus then permits, in accordance with the method, the diagnostic apparatus to recognize states in which a step has not been carried out, and to check the conditions for further execution of the main program. It is not necessary to generate specific error checking tables, or to look for possible error combinations. Consequently, the diagnostic apparatus can readily be adapted to various programs, and to programs which are changing. It is not necessary to additionally generate a second diagnostic program besides the original control program for the machine, or similar device or apparatus.

In accordance with a preferred feature of the invention, error checking is carried out only if the time for the entire sequencing of control steps of the controlled machine or engine or similar device exceeds a certain value, rather than engaging in a diagnostic error search in more or less regularly recurring intervals. Consequently, it is not necessary that the diagnostic device continouously supervise the control features of the primary control system; rather, it is possible to utilize a single diagnostic apparatus to supervise a plurality of control systems or a plurality of control functions in a large system.

The control system, based on a program stored in a memory, operates within the cycling time determined by the program. Special time periods for diagnostic checking do not, usually, arise. This is an advantage of this system, since real-time operation can be carried out, with diagnosis of errors as well.

The system of the present invention permits generation of the stepping structure of the program directly in the diagnostic apparatus upon reading-in of a new program or portion of a program into the primary control computer. The method, thus, has the additional and specific advantage that additional work for generating an error diagnostic program will not arise even though the memory controlled primary control system or computer is changed, or reprogrammed. The diagnostic device, due to its own inherent program, determines the sequencing of the particular control program of the primary control computer, or, rather, the stepping or sequencing structure thereof, and can store the respective individual steps or characteristics thereof in its own memory. In accordance with a preferred feature of the invention, commands in the primary program which are "SET" commands which follow an AND command, which logically conjoins the results of another SET command, are stored in the memory of the diagnostic computer, or diagnostic apparatus. In case of malfunction, the fault diagnostic apparatus checks the entire stepping or sequencing structure of the primary program with respect to its status. If the step which follows a preceding step including a SET command is erroneous, then, in a subsequent operation, the further execution conditions are checked with respect to proper signal conditions at the input to the primary control stored program. The fault which has been discovered is indicated. This preferred form permits particularly simple error diagnosis in linear control programs.

With complex control programs, it is desirable, in the event of a malfunction, to review the status of each instruction. If a step is not SET, despite the fact that the SET conditions in the preceding step were satisfied, then the conditions for continued execution must be erroneous.

The diagnostic apparatus to carry out the method, preferably, includes a computer arrangement which includes a fixed memory, and an addressable memory. The fixed memory contains the program to retrieve the stepping structure. The addressable or variable memory then stores the structure itself. This arrangement permits constructing a simple diagnostic apparatus at low cost.

DRAWINGS

DETAILED DESCRIPTION

Many industrial control systems have recently been constructed in the form of a programmable controllers (PC). Such freely programmable control arrangements have the advantage that programming is simple, and errors upon planning of the control steps and sequencing can be easily corrected. Specific hard-wiring, which is used in relay connections and the like, is no longer necessary.

Errors and malfunctions may arise even when using programmed memory control units, which may lead to down time of machines, shut-down of engines, and the like. The largest portion of such errors or malfunctions occur outside of the control unit as such. Many of the malfunctions can be traced to defective cabling, wiring, or limit switches and transducers. In order to minimize down time, or complete failure of an operation of an engine, and thus permit optimal utilization of the controlled apparatus, machine, engine, or other device, it is important that any externally occurring defects, malfunctions, faults or errors can be readily recognized, for quick repair or removal of the malfunction or defect. Contrary to fixed or hard-wired relay circuits, this is not readily possible when using PC's, since it cannot be recognized, externally, which one of the transducers, or which one of the connecting wires or cables is damaged, and on which point the program does not continue, since, for example, a transducer signal is missing. The PC's can inherently supervise the essential operation of associated input and output apparatus, for example supervising cyclical runs, voltage levels, and the like. Such supervisory, inherent monitoring, however, is not capable of recognizing errors and malfunction which occur peripherally with respect to the control unit or apparatus itself.

Malfunction and error which do not occur within the PC itself occur only if one or more input signals are not properly applied to the control unit. If the operator can be alerted to the absence of a particular missing input signal, for example by indicating the device from which the input signal is defective, then he can, without further knowledge of the sequence and the circuit diagram of the unit, readily localize the defects and, frequently, can carry out the necessary repair in minimum time. It is not necessary to call in a specialist for the computer apparatus; the usual machine operator, machinist or techician is readily capable of removing interruptions himself, so that the down time of the apparatus or engine can be held to a minimum level.

Figure 1:
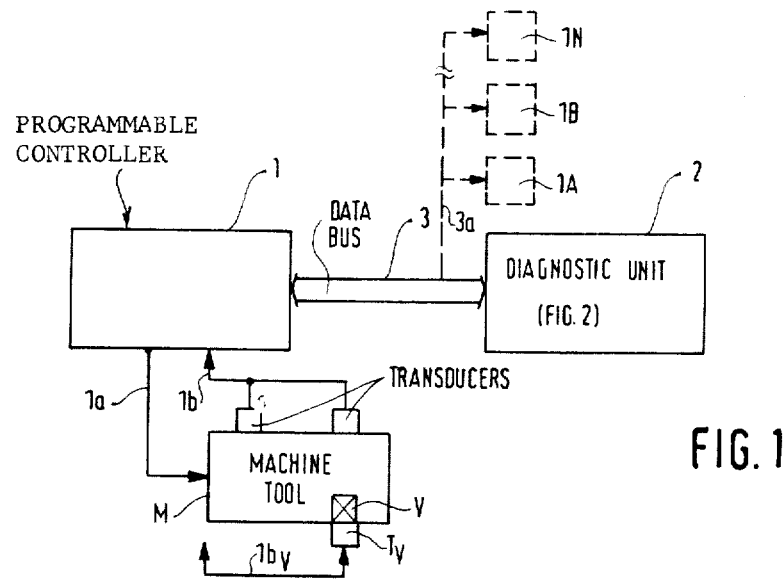
FIG. 1 is a schematic diagram illustrating the interconnection between a programmable controller and a diagnostic apparatus.

The fault error or malfunction must, however, be localized. Thus, it is necessary that the PC include diagnostic apparatus which indicates the particular locality or nature of the malfunction. The general arrangement is illustrated in FIG. 1.

A programmable controller (PC) 1, as is well known in the technology of machine tool or engine control units, is connected to a data bus 3 which is connected to the diagnostic unit or apparatus 2. The PC 1 controls, for example, operation of a machine tool by providing sequencing output signals thereto, as schematically indicated by output line 1a. The machine tool includes one or more transducers T which provide output signals over connecting lines or cabling 1b to the stored program operating unit, for example travel of a milling cutter or the like.

The diagnostic apparatus 2 may be part of the stored program unit 1, or can be attached thereto as a separate module thereof by connection thereto on a specific appropriate connecting point, or connection terminal of the data bus 3. The diagnostic unit 2 can be used to monitor a plurality of PC's 1A, 1B . . . 1N, as shown schematically by the broken-line bus 3a and the broken-line operating unit 1A. Such other operating units may be used, for example, to control other functions in the machine tool M, or supervise other machine tools, not separately shown.

Figure 2:
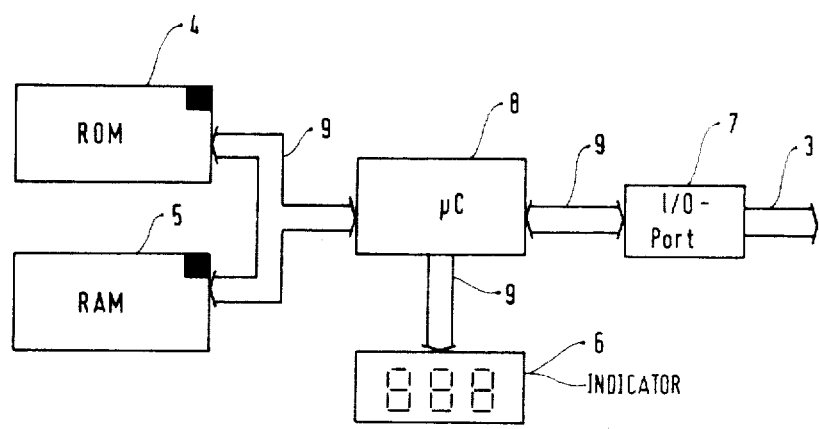
FIG. 2 illustrates the architecture of a diagnostic device in accordance with the invention.

FIG. 2 illustrates the diagnostic unit in detail. It includes a fixed or read-only memory (ROM) 4. Additionally, it includes a random access memory (RAM) 5. The ROM 4 and the RAM 5 are connected over a data bus 9 with a microprocessor 8. A suitable microprocessor 8 is the element 8751 made by INTEL, or 8751 made by Siemens. An indicator 6 is connected to the microprocessor 8, for example by a branch of the data bus 9, in order to provide an alphanumeric output representative of a particular type of error. The number 888 is shown, which, in accordance with a decoding table, may indicate a specific type of fault malfunction or error interfering with proper program execution by the programmable controller 1, for example arising within the machine tool M, one or more of the transducers T, or the cabling and connecting lines 1a, 1b, respectively.

An input/output (I/O) port 7 is further connected to a branch of the data bus 9. The output signal from the I/O port 7 is connected to the data bus 3 (FIG. 1) and to the PC 1.

In accordance with a feature of the invention, it is not necessary to include an application-specific diagnostic program within the diagnostic unit 2. The only essential feature is the adherence of the application program's structure to the program structures standard in the programmable controller field, which are described, for example, in Deutsche (German) Industrial Norm (Standard) DIN 40 719, part 6. The diagnostic routines are stored in the form of firmware within the ROM 4 and are not specific to a particular type of stored program, or to a specific problem. The I/O port 7 permits sensing of the programming sequence or structure of the stored program operating unit in the diagnostic apparatus 8—see connection of I/O port 7 to the data bus 3.

Figure 3:
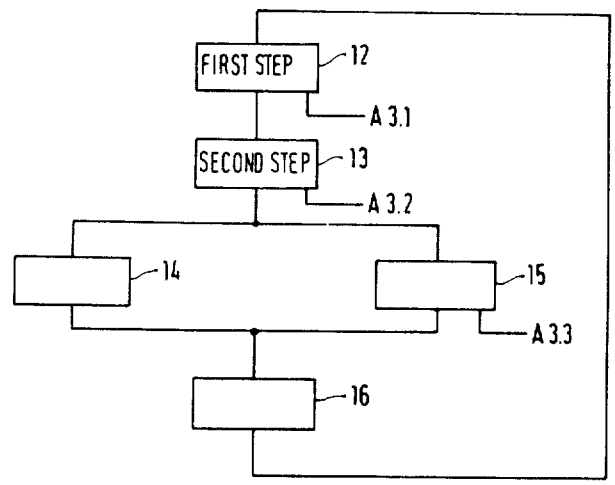
FIG. 3 is a flowchart of a program for a programmable controller.

FIG. 3 illustrates an example of the execution sequence of a stored program. Sequencing controls, necessarily, have a stepwise cycling, from one step to another, controlled by switching or stepping networks, or programs. The smallest functional unit of the program of sequencing controls is one sequencing step, also denoted as a short step. The sequencing control of FIG. 3 is built up of the steps 12 to 16.

The first two steps 12, 13 follow sequentially. Thereafter, branching to parallel steps 14, 15 results. The last step is step 16. The entire sequencing control with steps 12 to 16 is termed a sequencing chain, or a sequencing run. It is a specific characteristic of a sequencing run that the subsequent step being carried out resets the preceding one. The time required for coursing through the entire sequencing run is defined as one control cycle.

Customarily, each step is associated with an element characteristic of the specific step, for example a memory element, or memory address, together with the necessary network arrangements in order to carry out the object of the program. Sequential stepping, or continued execution of the subsequent steps, in accordance with the program, then is carried out in dependence on the further sequential program conditions. Such further sequential program conditions may be determined by the process, manufacturing steps or the like to be controlled, or may be dependent on time, or on external parameters, e.g. temperature.

Figure 4:
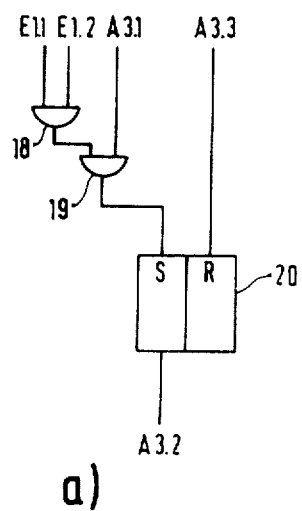
FIG. 4 illustrates the instruction sequence of a step of the program of FIG. 3.

FIG. 4 illustrates an example of a sequencing step.

FIG. 4, in illustration a, shows the electrical network interconnection which must be constructed by hardware. For example, inputs E1.1 and E1.2 have transducers connected thereto, e.g. a position transducer, a timing element, an output unit providing a specific time marker signal, or the like. The conditions of the two signals applied to the inputs E1.1 and E1.2 then determine the condition for further signal processing.

Input signals E1.2 and E1.2 are connected to the inputs of an AND-gate 18, the output of which is connected to one input of a further AND-gate 19. The second input to the AND-gate 19 is connected to a signal A3.1. This signal A3.1 is the output signal of a preceding step. The output of the AND-gate 19 is connected to the SET input S of a flip-flop (FF) 20. The output of the FF20 is connected to the output A3.2, which, for example, may be connected by line 1b, to the winding of an electro-hydraulic, or electro-pneumatic valve V (FIG. 1) including transducer $T_y$. FF 20 is reset by the output signal A3.3, connected to the RESET input R thereof. The output A3.3—in accordance with the preceding definition that a subsequent step resets the preceding one—is the output of the subsequent step.

FIG. 4b illustrates a software implementation, of the hard-wired circuit shown in FIG. 4a, for a programmable controller. The step illustrated is a single step, such as, for example, step 13 of FIG. 3.

The left column shows the memory address at which the respective instruction is stored in the memory of the programmable controller. The column "Operator" characterizes the command which is applied; the column "operand" determines which input or output is to be switched.

Memory address 0009, with command RA, stores and controls resetting of the output of the preceding step, for example—and referring to FIG. 3—the step 12. See input A3.1, FIG. 3. This reset condition (RA) of the preceding step is shown at 22 in FIG. 4, illustration b.

The signals which permit continuation of steps or sequencing of the cycle from one step to the subsequent next step are stored in memory address 0010 and 0011, and are schematically illustrated at 23 in FIG. 4, illustration b. The operator and the operand determine that the inputs 1.1 and 1.2 are logically joined by an AND-element, as determined by the operator UE. In the memory address 0012, the output of the preceding step 3.1 is monitored. As discussed above, continued processing of steps is dependent on events which had occurred in the past. Continued processing, thus, is dependent on the condition that a prior step has been carried out and, as a condition of subsequent steps, the carrying out of the prior step is necessary, and the signal 3.1 is a preparatory signal to carry out the subsequent step. It is logically conjoined by the AND element 19 with the step conditions set forth at 23 by operator UA. The conjunction at block 23 with the prior result is necessary since, in a course or run of the sequence, further signal processing in a step, in accordance with a program, can occur only when the previously called-for step has been processed. The memory address 0013 stores the SET output A3.2, for example by energizing the valve V. This is carried out by the SET status 25. Setting of the SET status 25 can occur only, however, if the prior cycling conditions 23 and 24 have been carried out, or have been met.

The output 3.2 remains SET until the output 3.3 of the subsequent instruction is enabled by placement in SET status. At that time, the output 3.2 must be immediately RESET. The RESET command 26 is stored in memory addresses 0014 and 0015, and causes resetting of the output 3.2—operator RA—as soon as the output 3.3 of the subsequent step is SET, as indicated by operator UA, which, of course, corresponds to the same operator as in step 24. The reset command of the output 3.2, operator RA, is structured in the same way as the reset command RA of 22, of which only the last instruction is shown.

Further steps in the cycle are arranged in a similar manner, as is apparent.

Let it be assumed that the programmable controller 1 has a sequencing cycle stored therein. The diagnostic unit must have the structure of the sequencing steps applied thereto. Preferably, and in accordance with a feature of the invention, this step structure is abstracted by the diagnostic unit itself. The diagnostic unit, in accordance with a feature of the invention, utilizes the feature of the program that the structure of all steps is similar, or has similar sequential features and, in general, includes prerequisite conditions for continued execution and the setting and resetting of results or outputs of a step. The step structure can be input into the diagnostic unit by the author of the program for the programmable controller, or, preferably, it is possible with appropriately equipped diagnostic units to have the diagnostic unit itself abstract the step structure. Determination of the step structure is only necessary when a new program is to be read into the PC 1.

Figure 5:
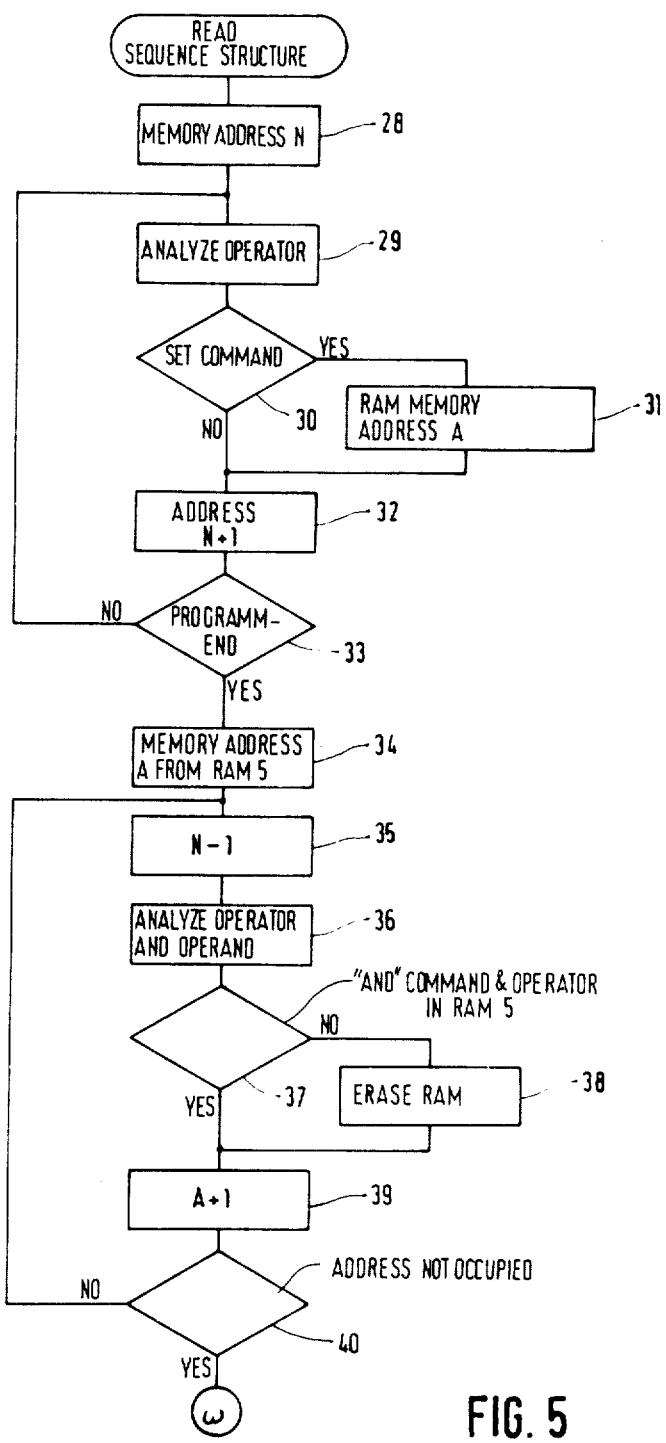
FIG. 5 is a flowchart illustrating how the step structure is abstracted by the diagnostic apparatus.

FIG. 5 is a flowchart with which abstracting of the stepping structure will be explained. The method to generate the stepping structure is independent of the application program type and, therefore, can be used for any program which is read into the programmable controller. A program which implements this method, thus, can be placed into the ROM 4 of the diagnostic unit 2 (see FIG. 2).

The diagnostic device 2 recalls over the I/O port 7 the contents of each one of the occupied memory addresses N in the programmable controller, see block 28, FIG. 5. The operator stored at the respective address is analyzed. If the operator is a SET command—for example the operator at the memory address 0013—then RAM 5 will store at memory location A the actual memory address, the operator, and the operand; this is illustrated by blocks 30 and 31 in FIG. 5. After storage of this command line in the RAM 5 of the diagnostic unit 2, or, if no SET command was sensed, the address is incremented—see block 32—and, assuming that the program is not at an end—block 33—a loop is formed to again analyze the operator at the next memory address N+1.

The fact that a SET command has been issued is a necessary condition, but not a sufficient one, for presence of a step in the sequential program. In a second cycle, thus, the memory addresses N within the RAM 5 are recalled once more—see block 34—and the address in advance of the SET command in the PC 1 is checked—see block 35. The diagnostic device then checks the operand and the operator with that address at 35. If the memory address N which was orginally recalled—block 28—was address 0013, then, now, the memory address 0012 is analyzed with respect to the operator and the operand. If the operator is an AND command, and if the operator is stored somewhere in the RAM 5, then the subsequent command must be a SET command, which is characteristic for a step. In this connection, it will be recalled that in the steps of a sequential cycle, or a run, any step is prepared by a preceding step, so that, upon conjunction with the next step, the state of the preceding step must be tested or checked. In the example shown in illustration b of FIG. 4, the test is simple since the operand 3.1 is also the operand of the preceding step. Programming control loops, however, and branches may be included in the overall program, so that the operand may be a variable which refers to a different output. If no AND command is present, and if the operand is not stored in some way or another in the RAM 5—see block 31—then the subsequent SET command is not a command which initiates a new step, but, rather, may be a terminating command, for example a command to provide an indication. Such commands are not indicative of a step in the stepping structure or pattern. These commands, thus, are therefore erased from the RAM 5—see block 38, FIG. 5. The next address in the RAM 5 then is interrogated, see step 39.

In this manner, the previously stored data in the RAM—see block 31—are tested and checked once more to determine if the required prerequisite conditions for these commands are stored in the RAM 5.

When all the memory locations in the RAM 5 have been checked or tested, then the actual stepping structure of the stored program is stored within the diagnostic unit 2. In the example shown in FIG. 3, memory addresses for five steps are occupied in the RAM 5. In the example according to FIG. 4, see illustration b, line 25 is stored at the address 0013.

Diagnostic tests can be carried out at regular intervals. Malfunctions, faults and errors occur, however, only comparatively rarely, and it is not necessary, or suitable, to make such regularly recurring tests. It is desirable, and preferred, to initiate an automatic diagnosis only if a predetermined time is exceeded for the run-through of a program run, or cycle. The diagnostic device, then, under control of a timing means set, for example, to test the time taken for a normal or entire program run, provides a switching signal to the diagnostic unit when the time is exceeded; the diagnostic device then interrupts over to the data bus and—see FIG. 6—interrogates the respective memory addresses from the RAM 5 of the diagnostic unit.

Figure 6:
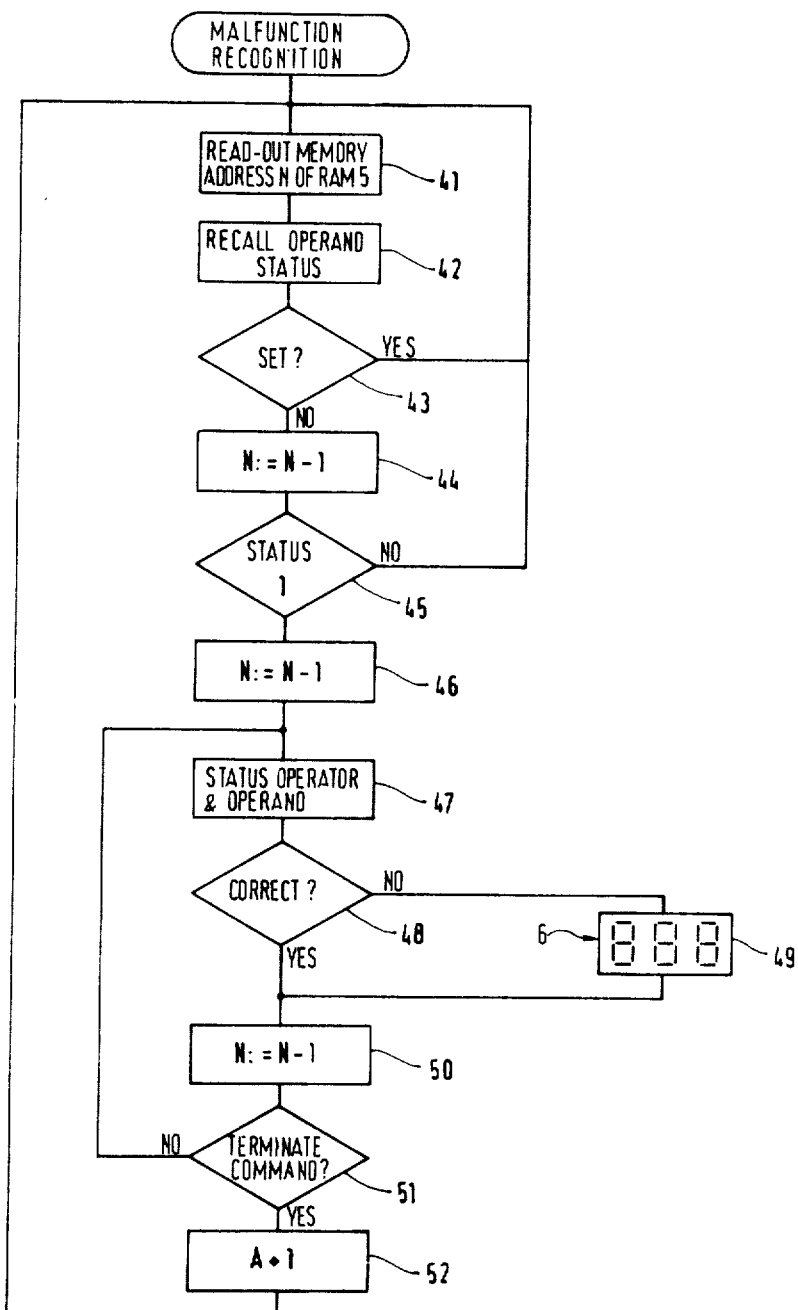
FIG. 6 is a flowchart illustrating the process of fault searching by the diagnostic apparatus.

Referring to FIG. 6, which schematically shows recognition of malfunction, fault or error: In step 41, the memory address N of the RAM 5 is read-out. In a subsequent step, the status of the operand in that programmable controller (PC) memory address is tested or analyzed. The status of a memory address is the state in which the operand of the specific or respective memory address then appears. This may, either, be a ZERO or a ONE. If the corresponding memory address in the PC is SET, then a logic-1 signal is generated; if the memory address is RESET, then a logic-0 signal is generated. In the test block 43, the status of the operand is checked. If the status indicates SET, then the step is in order, since the further conditions for continued execution at this step have been met. A further testing or checking is not necessary, and the next memory address from the RAM 5 can be recalled.

If the state, however, is NOT SET (or RESET), then a fault in the conditions for continued execution may be present. Indicative of such a fault is the contents of the location preceding the read-out adress, see step 44, in which the address N is decremented by one, since that address N−1 was the address which provided the signal necessary for the preparation of the next step, in this case the step N. This address, however, consists of an AND-command and an operand, which refers to a preceding step since, otherwise, the instruction would have been erased—compare FIG. 5, blocks 37, 38. Thus, if, upon testing, it was found that the memory address 0013 was NOT SET, then it must be determined if the conditions for the step of address 0012 have been proper and have been provided. If this address is NOT SET, that is, if it has a 0-signal or status, then this means that the step which preceded that step has not yet run through, or had already been run through and terminated. Thus, the next or subsequent step cannot be set.

The search process, then, is terminated, and the next memory address N is recalled from the RAM (block 41).

If the preparation for the step has been SET, then this means that some other conditions required for continued execution beyond this step have not been fulfilled since, otherwise, a SET command would have been presented. It is then necessary to investigate the further processing instructions 23 (FIG. 4). To do so, the memory address is decremented by one. After the memory address 0012, the memory 0011 is interrogated—see block 46, FIG. 6. The status of this memory address is then determined in dependence on operator and operand. If, as in the example of FIG. 4, an AND-conjunction is present, then the status of this memory address also must be a ONE. Since, however, it is also possible that "NOT" or "NOT OR" relationships are possible, it is also possible that the reverse status is correct. This, however, can be determined from the operator. If the status is correct—see block 48—FIG. 6, then the next higher address is searched. If the status is incorrect, it means that at that memory address the further execution conditions have not been met. Considering the example of FIG. 4, illustration b, it means that at the memory address 0011, the input 1.2 operates faultily. This is indicated by the indicator 6, also shown at block 49, FIG. 6. The operator now knows that the input 1.2 is defective, for example due to a break in a connecting line, $1b_\nu$, short circuit, or a defective transducer, and, by means of a simple diagnostic table, can correlate the output 888 with a specific transducer $T_\nu$ (FIG. 1) or cabling, etc. connected thereto. Thus, the fault has been found which might have lead to shut-down of the machine, engine, or other device.

Usually, for a step to be carried out not only one, but a plurality of conditions, must be satisfied. In a further step, see block 50, FIG. 6, the memory address is incremented by one, in order to test the next execution condition. In the example of FIG. 4, the condition is stored at address 0010. Before such a test is carried out, however, a further step is used to check if, possibly, a "terminate" command was present.

A terminate command may be present if the operator, for example, is a SET command, a RESET, or a command to go to a specific memory location. In FIG. 4, illustration b, this is the case in memory address 0009. The reset command RA resets the output or result 3.1. A test for a terminate command thus will be negative. If so, the loop is exited. If, however, a further execution condition is to be tested, then the loop is run through once more, in which the status of the execution conditions is tested in dependence on operator and operand. If a terminate command is present, the next address is recalled from the RAM 5 and, then, all further execution conditions within the run are tested.

Based on the data which are displayed on the indicator 49, the operator can readily determine the faults which may be present and, sequentially, remove all of the malfunction or error sources. Usually, only a single fault may be indicated.

The data bus may have data display units connected thereto, or different types of indicators which may, inherently, decode the output indication here shown only as an alphanumerical output in order to provide further data, for example leading to instructions for repair, and further to simplify troubleshooting and provide directly readable output for simplification of service or maintenance work.

The method, the steps of which are especially illustrated in FIG. 6, permits checking and monitoring not only of straight runs, but also on runs having branched cycles, loops, and jump commands. Checking of prerequisite conditions for continued execution is carried out backwardly, that is, from the SET address of the execution step in which the fault occurred. It is, thus, also possible to determine prerequisites for continued execution which are pointed to by a jump command, or to which, at any point of the program of the PC 1, reference is to an intermediate result stored, for example, at a specific memory address, and which is necessary for logical conjunction with a further step.

Consequently, the steps need not be stored in the programmable controller in the sequence of their execution, but rather, it is possible, by means of markers, to refer to other program subroutines.

The diagnostic program can be substantially simplified if the run in the PC is serially constructed, that is, if the program of the programmable controller 1 is so arranged that each step of the run is programmed in the sequence in which it is to be carried out. If that is the case, another feature of the step structure can be utilized, which is explained best in reference to the example in FIG. 4, specifically illustration b.

If the runs of a program use sequential steps, which are sequentially programmed, then, and as illustrated in FIG. 4, step 13 follows step 12; step 15 follows step 13. This means that, sequentially, the outputs or results A3.1, A3.2 and A3.3 will be SET. Since only one output at a time may be SET, and this output is cancelled only when the continued sequencing conditions for the next output have been fulfilled, the test program must only determine in which address stored in the RAM 5 the status ONE is entered. The step subsequent to the step which has the ONE stored therein must be erroneous since, due to the fault, the conditions at the preceding step for continued execution cannot be obtained, since the preceding step could not be RESET. As an example: Let it be assumed that the output A3.2 in the address 0013 (FIG. 4—illustration b) is SET. RESET of the output A3.2 cannot be commanded by a command in the memory address 0015 if the output A3.3 cannot be SET. A condition for further execution is missing. The diagnostic apparatus 2 can recognize that the status of the memory address 0013 is a ONE and can immediately switch to the next memory address of the step which is stored in the RAM 5. The conditions for this next step are then tested.

This method permits substantial simplification and thus acceleration of testing of the sequencing of the steps by the diagnostic apparatus. This permits the diagnosis to be carried out more rapidly, and programs necessary for the testing, which may be required, can be substantially simplified, so that the memory capacity of the ROM 4 can be held to a lower level. Further, the counter search requirements, illustrated in FIG. 6, can be stored together with the analysis of the stepping or sequencing structure in the ROM 4 of the diagnostic apparatus.

The diagnostic apparatus, thus, permits checking if sequential steps to be carried out by the machine tool M, for as signaled to the PC by the transducers T, are properly being carried out and controlled by proper sequencing. If any one of the signals for the next subsequent steps should be missing, or should be incorrect—for example due to malfunction of a transducer, a cable break, a short circuit erroneously introducing a ONE where a ZERO should be present, or the like, which would interfere with the execution, the diagnostic apparatus can readily determine not only the fact that a fault occurred but exactly where the fault occurred. Of course, it is possible to monitor the particular transducers and their connecting lines individually. The present method, however, permits carrying out such monitoring by a program which utilizes the characteristic of a sequential stored program for operating units, such as machine tools, engines and other devices that, for any step to be carried out, a preceding step must have a clearance signal applied thereto as a necessary condition for the subsequent step. Searching for the last stored correct step, then, will likewise provide an indication that the source of trouble is in connection with the following one.

Various changes and modifications may be made within the scope of the inventive concept.

The output indication can be controlled by a counter which, for example, is arranged to provide a display of counted steps. The specific step in the program which is stored in the programmable controller, and which controls the machine tool, or device M, can readily related operating steps required therein with particular elements within the device M, for example the valve V, the operation of which is reported to the stored program operating unit by the transducer Tv over the line $1b_v$.

We claim:

1. In the combination of a programmable controller (1) and a device (M), particularly a machine tool, controlled thereby, in which:

said controlled device (M) includes operating elements (V) selectively controlled by the programmable controller, and transducers (T) and control lines connected to, and signaling operating conditions of, the device (M) to the programmable controller (1);

said programmable controller (1) issues commands to said operating elements, based upon a set of program instructions stored at memory locations or addresses within said controller;

said program comprises a sequence of program steps, each of which can be initiated only upon occurrence of a RESET status at the end of any preceding step;

certain of said program instructions comprise SET commands and certain of said program instructions comprise AND commands;

a diagnostic unit (2), including a random-access memory (RAM), is connected to the programmable controller (1); and a malfunction output indicator (6, 49) is provided, controlled by the diagnostic unit and indicating malfunction, and the nature of the malfunction, in the run of a program in which the programmable controller (1) controls sequential operating steps or conditions of said controlled device, a method of recognizing errors in the execution of the program steps, and hence of the control signals applied by the programmable controller (1) to the controlled device (M), comprising the steps of loading sequentially into said diagnostic unit (2) consecutive instructions of the stored program within the programmable controller (1)

analyzing each instruction to determine whether it contains a SET command and, if so, storing the instruction in the RAM of the diagnostic unit;

loading sequentially into said diagnostic unit (2) the instruction, of the stored program within the programmable controller (1), adjacent to and preceding each SET-command-containing instruction;

analyzing said preceding instruction to determine whether it contains an AND operator and, if not, erasing said adjacent SET-command-containing instruction from the RAM of the diagnostic unit as not being indicative of a program step;

upon the lapse of more than a predetermined period of time for execution of a predetermined portion of the program, searching for the last program step which terminated in a RESET status, then determining which of several necessary conditions for the completion of the next succeeding step was not satisfied;

and, providing an output indication on the malfunction output indicator (6, 49) indicating the source of each signal which did not satisfy the necessary condition for completion of the next succeeding step.

2. Method according to claim 1, further including the step of determining if the time for a complete cycle of sequenced steps (FIG. 3: 12–16) provided by the programmable controller (1) to said device (M) is within, or without, a predetermined time limit;

and initiating said interrogation step by the diagnostic stage of the predetermined time limit is exceeded.

3. Method according to claim 1, including the step of recalling, sequentially, the steps of the stored program in the programmable controller (1) and storing, in one of said memories (4, 5), all the addresses which include a SET command;

and, in a subsequent test cycle, erasing the addresses of those SET commands which are not preceded by an AND-command.

4. A self-diagnosing automated system for carrying out the method of claim 1, said system comprising the combination of a programmable controller (1), a diagnostic unit (2), and a device (M), particularly a machine tool, connected to and controlled by a program stored within the programmable controller in which the controlled device (M) includes operating elements (V) selectively controlled by the programmable controller (1), transducers (T), and connecting lines (1b) connected to, and signaling operating conditions of, the device (M) to the programmable controller (1);

wherein said diagnostic unit (2) is connected to the programmable controller (1) and includes a malfunction or fault output indicator (6, 49), and wherein, in accordance with the invention, the diagnostic unit (2) comprises a processing element (8) including a timing means;

a fixed memory (ROM 4) and a random access memory (5);

at least one internal diagnostic unit data bus (9) interconnecting said processing element (8), said memories (4,5), and said malfunction indicator (6, 49), and a data bus (3) connecting the processing element with said programmable controller (1), said fixed memory (4) storing, therein, diagnostic routines which direct said diagnostic unit (2) in carrying out said steps of loading from said programmable controller the instructions stored therein, analyzing the instructions to determine the step structure of the particular program stored in said programmable controller, and determining whether and which necessary conditions for completion of successive steps of the stored program have been satisfied, said random access memory (5) storing, therein, those instructions from the program stored in said programmable controller which are indicative or characteristic of a step;

said timing means providing to said diagnostic routines an indication of whether execution by said programmable controller of said stored program has taken more than said predetermined period of time;

said processing element (8), executing instructions of said diagnostic routines, interrogating the programmable controller (1) to determine at which step of the execution, by said programmable controller, of said program stored therein, the predetermined period of time was exceeded and the source of the signal which did not satisfy said necessary condition, and providing an output indication of malfunction or fault location on said output indicator (6, 49).

5. The combination of claim 4, further including an input/output port (7) connecting the processing element (8) to the data bus (3) to provide for recall and storage, in accordance with the diagnostic routines within the fixed memory (ROM 4), of the step structure of the program stored in the programmable controller.

6. The system of claim 4, wherein said processing element is a microprocessor.

7. The system of claim 6, wherein said microprocessor is an Intel 8751.

8. The combination of a programmable controller (1), a diagnostic unit (2), a data bus (3) interconnecting said controller and diagnostic unit, a device (M) controlled by the programmable controller, and transducers (T) and input lines (1b) connected to, and signaling operating conditions of, the device (M) to the programmable controller (1)

wherein, in accordance with the invention, the programmable controller includes a memory storing a particular application program therein;

the diagnostic unit (2) includes a microprocessor (8), a random-access memory (4), a read-only memory (5), and an interconnecting data bus (9); and diagnostic routines are stored in said read-only memory (5), said routines including:

means for recognizing each time that a new applications program is read into said programmable controller, abstracting the step structure of said applications program, and recording said abstract in said random-access memory (5);

means for determining whether execution by said programmable controller of said applications program has taken more than a predetermined period of time;

means for determining which instruction of said applications program was in progress when said predetermined period of time was exceeded;

means for determining from which of said transducers signals were necessary for execution of said instruction in progress, and which of said necessary signals were missing;

and means for generating a code identifying which input line failed to provide said missing signal.

* * * * *